(12) United States Patent
Shin et al.

(10) Patent No.: US 11,362,361 B2
(45) Date of Patent: Jun. 14, 2022

(54) MEMBRANE-ELECTRODE ASSEMBLY AND METHOD FOR MANUFACTURING THE SAME

(71) Applicant: KOREA INSTITUTE OF ENERGY RESEARCH, Daejeon (KR)

(72) Inventors: Sung Hee Shin, Daejeon (KR); Byung Chan Bae, Daejeon (KR); Seok Hee Park, Daejeon (KR); Chang Soo Kim, Incheon (KR); Won Yong Lee, Daejeon (KR); Gu Gon Park, Daejeon (KR); Tae Hyun Yang, Daejeon (KR); Sung Dae Yim, Daejeon (KR); Min Jin Kim, Daejeon (KR); Young Jun Sohn, Daejeon (KR); Seung Gon Kim, Daejeon (KR); Dong Won Shin, Sejong-si (KR); Hwan Yeong Oh, Daejeon (KR); Hye Jin Lee, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 113 days.

(21) Appl. No.: 16/817,114

(22) Filed: Mar. 12, 2020

(65) Prior Publication Data
US 2021/0159529 A1 May 27, 2021

(30) Foreign Application Priority Data
Nov. 21, 2019 (KR) .......................... 10-2019-0150667

(51) Int. Cl.
*H01M 8/10* (2016.01)
*H01M 8/1004* (2016.01)
*H01M 4/86* (2006.01)

(52) U.S. Cl.
CPC ....... *H01M 8/1004* (2013.01); *H01M 4/8668* (2013.01)

(58) Field of Classification Search
CPC ............. H01M 8/1004; H01M 8/1016; H01M 8/1018; H01M 8/1041; H01M 4/8668; H01M 4/8652; H01M 4/8647
See application file for complete search history.

(56) References Cited

U.S. PATENT DOCUMENTS

2017/0294670 A1* 10/2017 Maruyama ............ H01M 8/106
2020/0014037 A1* 1/2020 Seol ..................... H01M 4/8828
2021/0005912 A1 1/2021 Kunita et al.

FOREIGN PATENT DOCUMENTS

JP 2006-302600 A 11/2006
KR 10-2019-0004949 A 1/2019
(Continued)

*Primary Examiner* — Raymond Alejandro
(74) *Attorney, Agent, or Firm* — Birch, Stewart, Kolasch & Birch, LLP (57) ABSTRACT

Provided is a method for manufacturing a membrane-electrode assembly. The method includes forming an electrode layer, preparing a porous support layer, and positioning the electrode layer on each of both surfaces of the porous support layer and hot-pressing the electrode layer positioned on the both surfaces. The forming of the electrode layer incudes forming a functional layer including a hydrogen ion conductive binder resin on at least a portion of an electrode catalyst layer, and forming an electrolyte layer on at least a portion of the functional layer. The preparing of the porous support layer includes performing a pretreatment process by impregnating the porous support layer with a pretreatment composition, and the performing of the pretreatment process includes dipping the porous support layer in a first pretreatment composition and then drying the porous support layer, and dipping the porous support layer after drying in a second pretreatment composition.

18 Claims, 6 Drawing Sheets

(56) References Cited

FOREIGN PATENT DOCUMENTS

KR  10-2019-0081380 A   7/2019
WO  WO 2019/188572 A1  10/2019

* cited by examiner

Example 1

Comparative
Example 3

Comparative
Example 4

MEMBRANE-ELECTRODE ASSEMBLY AND METHOD FOR MANUFACTURING THE SAME

CROSS-REFERENCE TO RELATED APPLICATION(S)

This application claims the benefit of Korean Patent Application No. 10-2019-0150667 filed on Nov. 21, 2019, in the Korean Intellectual Property Office, the disclosure of which is incorporated herein by reference.

BACKGROUND

1. Field of the Invention

The present invention relates to a method for manufacturing a membrane-electrode assembly, a membrane-electrode assembly, and a fuel cell.

2. Description of the Related Art

A membrane-electrode assembly including a polymer electrolyte membrane and an electrode is a core component having an effect on performance and durability of a polymer electrolyte fuel cell. The polymer electrolyte membrane from the components most typically includes a perfluorinated polymer electrolyte membrane such as Nafion® membrane manufactured by Dupont Corporation and Aquivion® membrane manufactured by Solvay Corporation, and research of developing a hydrocarbon polymer electrolyte membrane for replacing an expensive perfluorinated polymer electrolyte membrane is actively under way. Physical degradation is occurred in the electrolyte membrane while an electrolyte membrane is repeatedly being contracted and expanded in an environment in which a fuel cell is driven, and chemical degradation is occurred in the electrolyte membrane by hydrogen peroxide and hydroxy radicals generated from an air electrode. Such degradations of the electrolyte membrane increase interfacial resistance by easily separating an electrode and an electrolyte membrane. Meanwhile, electrode degradation is occurred by melting, agglomeration, movement, metalloid, and metal oxide formation of Pt depending on a method for manufacturing a membrane-electrode assembly.

A manufacturing technology of a transfer method (a so-called decal process) for minimizing electric resistance by maximizing adhesion compatibility between an electrolyte membrane and an electrode as process of manufacturing a membrane-electrode assembly has widely been used.

Recently, Gore Corporation has developed a new process of manufacturing a membrane-electrode assembly by a multilayer coating method. However, since the process requires a drying process in every step of coating an electrode and an electrolyte, there are problems that a line of the process is lengthened, and it is difficult to apply a standardized electrode catered to the needs of customers.

Chemical degradation of a polymer electrolyte membrane due to hydroxy radicals generated during operation of a fuel cell is a major issue in performance of a membrane-electrode assembly (MEA). An MEA bonding method (a so-called decal process) by an existing hot pressing transfer method is a manufacturing process which is focused on a perfluorinated sulfonic acid membrane having a low glass transition temperature.

Particularly, when manufacturing the MEA from a perfluorinated sulfonic acid membrane of a short side chain having a high glass transition temperature and an aromatic hydrocarbon polymer by a hot pressing transfer method, higher temperature and pressure conditions are required, and interfacial stability of a completed product is deteriorated. Further, a hot pressing transfer method of a high pressure may cause a mechanical defect fatal to a thin electrolyte membrane. Interfacial stability is deteriorated also in a reinforced composite membrane of which the surface has hard characteristics when manufacturing the MEA by the decal process. Such manufactured MEA has a problem that performance of the fuel cell is reduced sharply as a detachment phenomenon between an electrolyte membrane and an electrode is occurred, and durability is deteriorated during operation of a fuel cell. Although an MEA manufacturing process including a reinforced composite membrane has recently been developed by a continuous coating method, as a drying process is required in every coating step, there is a problem that a line of the process is lengthened, and there is a demerit that it is difficult to standardize size of an electrode in accordance with customers' needs.

SUMMARY

In order to solve the above-mentioned problems, an object of the present invention is to provide a method for manufacturing a membrane-electrode assembly, the method which improves physical and chemical durability of a membrane-electrode assembly, and reduces process line and improves continuity of the process by a hot-pressing process.

Another object of the present invention is to provide a membrane-electrode assembly which can improve performance of a fuel cell by applying a method for manufacturing a membrane-electrode assembly according to the present invention, thereby improving physical and chemical durability and minimizing interfacial resistance.

Another object of the present invention is to provide a fuel cell including a membrane-electrode assembly according to the present invention.

However, objects to be solved by the present invention are not limited to the above-mentioned objects, and other objects that are not mentioned may be clearly understood by those skilled in the art in the following description.

An aspect of the present invention provides a method for manufacturing a membrane-electrode assembly, the method comprising the steps of: preparing an electrode layer; preparing a porous support layer; and positioning the electrode layer on both surfaces of the porous support layer, and hot pressing the electrode layer positioned on both surfaces of the porous support layer, wherein the step of preparing the electrode layer comprises the steps of: forming a functional layer including a hydrogen ion conductive binder resin on at least a portion on an electrode catalyst layer; and forming an electrolyte layer on at least a portion on the functional layer.

According to an embodiment of the present invention, the functional layer further comprises a functional additive including an antioxidant, a gas permeation adjusting agent, or both thereof, the antioxidant includes at least any one selected from the group consisting of cerium (III) ions, manganese (III) ions, cerium oxide ($CeO_2$), manganese oxide ($MnO_2$), and cerium nanoparticles, and the gas permeation adjusting agent includes metal-supported carbon particles, and the metal may be a single metal or alloy comprising at least any one selected from the group consisting of platinum (Pt), nickel (Ni), and iron (Fe).

According to an embodiment of the present invention, a ratio (mol %) of the antioxidant to the gas permeation adjusting agent may be 1:0.01 to 1:20, and a ratio (mol %) of the hydrogen ion conductive binder (based on mole of a sulfonic acid group within the binder) to the antioxidant, the gas permeation adjusting agent, or both thereof may be 1:0.001 to 1:0.2.

According to an embodiment of the present invention, the functional layer may have a thickness of 1 μm to 10 μm.

According to an embodiment of the present invention, the hydrogen ion conductive binder resin may comprise at least any one selected from the group consisting of a perfluorinated polymer, a sulfonated hydrocarbon-based polymer, a benzimidazole-based polymer, a polyimide-based polymer, a polyetherimide-based polymer, a polyether ketone-based polymer, a polyether ether ketone-based polymer, and a polyphenylquinoxaline-based polymer.

According to an embodiment of the present invention, the step of forming an electrolyte layer on at least a portion on the functional layer may comprise the steps of: preparing an electrolyte layer coating composition comprising a hydrogen ion conductive binder resin and a nonaqueous solvent; and coating the coating composition on at least a portion on the functional layer.

According to an embodiment of the present invention, the hydrogen ion conductive binder resin may be included in an amount of 1 wt % to 40 wt % in the electrolyte layer coating composition, and the hydrogen ion conductive binder resin may be the same as or different from a hydrogen ion conductive binder of the functional layer.

According to an embodiment of the present invention, the nonaqueous solvent may include at least any one selected from the group consisting of a primary alcohol, a secondary alcohol and a tertiary alcohol having 4 to 20 carbon atoms.

According to an embodiment of the present invention, a thickness ratio of the functional layer to the electrolyte layer may be 1:0.5 to 1:10.

According to an embodiment of the present invention, the step of preparing the porous support layer may further comprise a step of performing a pretreatment process by impregnating the porous support with a pretreatment composition, and the step of performing the pretreatment process may comprise dipping the porous support in the pretreatment composition at a temperature of 1° C. to 80° C. for 1 to 60 minutes.

According to an embodiment of the present invention, the step of performing the pretreatment process may comprise the steps of: dipping the porous support in a first pretreatment composition and then drying the porous support; and dipping the dried porous support in a second pretreatment composition, and the porous support after the step of performing the pretreatment process may be in a state that the porous support is moisturized or semi-dried by the second pretreatment composition.

According to an embodiment of the present invention, the first pretreatment composition may comprise an organic solvent, and the second pretreatment composition may comprise a hydrogen ion conductive binder resin and an organic solvent.

According to an embodiment of the present invention, the second pretreatment composition may comprise 0.5 wt % to 20 wt % of the hydrogen ion conductive binder resin.

According to an embodiment of the present invention, the second pretreatment composition may further comprise an impregnation accelerator, the second pretreatment composition may comprise 0.01 wt % to 10 wt % or 0.1 wt % to 5 wt % of the impregnation accelerator, and the impregnation accelerator may include a nonionic surfactant, an ionic surfactant, or both thereof.

According to an embodiment of the present invention, the organic solvent may include an alcohol having 1 to 20 carbon atoms, an aprotic solvent, or both thereof, and the second pretreatment composition may have a mixing ratio (mass ratio) of one alcohol to the other alcohol of 1:10 to 1:30 when applying two or more alcohols.

According to an embodiment of the present invention, the second pretreatment composition may comprise an aqueous solvent including alcohol, or a nonaqueous solvent including an aprotic solvent.

According to an embodiment of the present invention, the step of performing the hot-pressing process may comprise positioning an electrode layer such that an electrolyte layer comes into contact with each of both surfaces of the porous support in a moisturized state or a semi-dried state, and performing the hot-pressing process.

According to an embodiment of the present invention, the step of performing the hot-pressing process comprises performing a roll lamination process at a temperature of 100° C. to 200° C., a pressure of 1 kgf/cm$^2$ to 100 kgf/cm$^2$ and a speed of 1 mm/sec to 100 mm/sec.

Another aspect of the present invention provides a membrane-electrode assembly including: a porous support; and an electrode layer which is positioned on both surfaces of the porous support, wherein the electrode layer includes: an electrode catalyst layer; a functional layer which is formed on the electrode catalyst layer; and an electrolyte layer which is formed on the functional layer, wherein at least a portion of the electrolyte layer is impregnated in a thickness direction of the porous support.

Another aspect of the present invention provides a fuel cell including a membrane-electrode assembly according to the present invention.

The present invention can provide an electrode layer (or an electrode) which can maximize penetration of the electrolyte layer with a porous support by forming a functional layer and an electrolyte layer on a catalyst layer (electrode), and a membrane-electrode assembly of which physical and chemical durability and performance are improved by a new hot-pressing process using a porous support with improved density.

The present invention facilitates standard adjustment of a membrane-electrode assembly, and can improve economic efficiency of manufacturing process by performing a continuous process, thereby reducing a process line and improving process efficiency.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, embodiments of the present invention will be described in detail with reference to the accompanying drawings. In the description of the present invention, if detailed descriptions of related disclosed art or configuration are determined to unnecessarily make the subject matter of the present invention obscure, they will be omitted. Also, terms used in the present specification are used to appropriately describe the embodiments of the present invention and thus may be changed depending on a user, the intent of an operator, or the practices of the field that the present invention belongs to. Therefore, the definitions of the terms used in the present description should be construed based on the contents throughout the present specification. The same reference numerals disclosed in each drawing represent the same constituent elements.

In the whole present specification, when any member is positioned "on" the other member, this not only includes a case that the any member is brought into contact with the other member, but also includes a case that another member exists between two members.

In the whole present specification, if a prescribed part "includes" a prescribed element, this means that another element can be further included instead of excluding other elements unless any particularly opposite description exists.

Hereinafter, a method for manufacturing a membrane-electrode assembly according to the present invention, a membrane-electrode assembly, and a fuel cell will be described in detail with reference to embodiments and drawings. However, the present invention is not limited to such embodiments or drawings.

The present invention relates to a method for manufacturing a membrane-electrode assembly, and the method for manufacturing a membrane-electrode assembly according to an embodiment of the present invention comprises: step S100 of preparing an electrode layer; step S200 of preparing a porous support layer; and step S300 of performing a hot-pressing process. Hereinafter, the method will be described more in detail by referring to FIG. 1 and FIG. 2.

According to an embodiment of the present invention, the step S100 of preparing an electrode layer is a step of forming an electrode layer in which a functional layer and an electrolyte layer are formed on at least a portion of one surface or both surfaces of an electrode catalyst layer.

Figure 1:
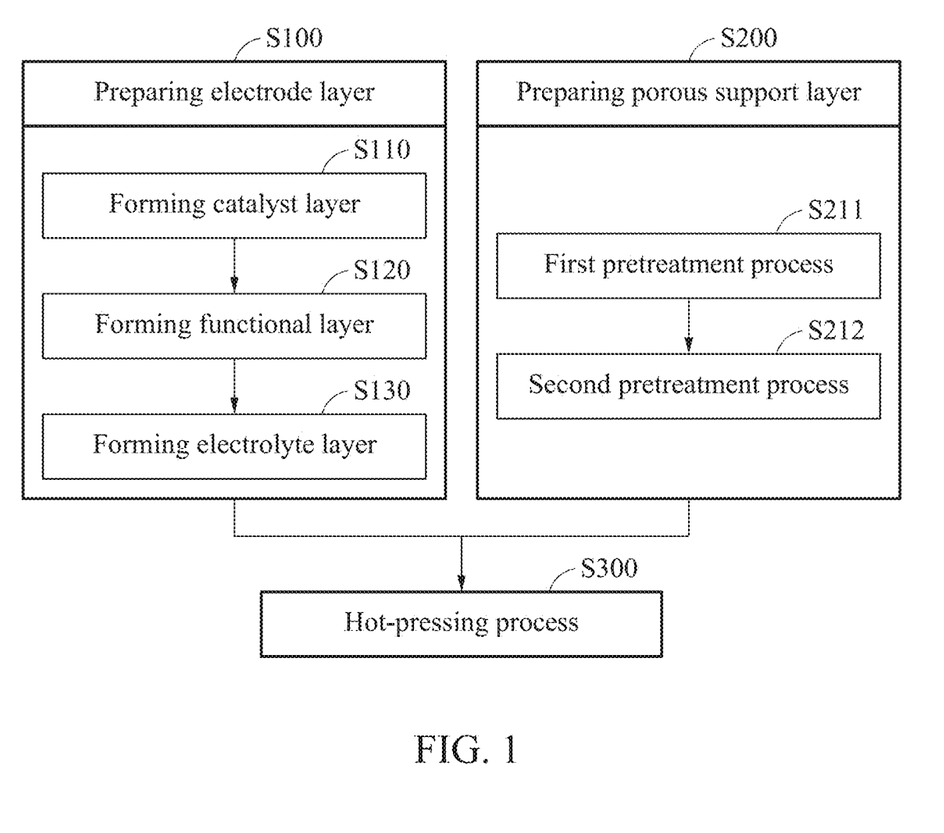
FIG. 1, according to an embodiment of the present invention, illustrates a flowchart of a method for manufacturing a membrane-electrode assembly according to the present invention.
Figure 2:
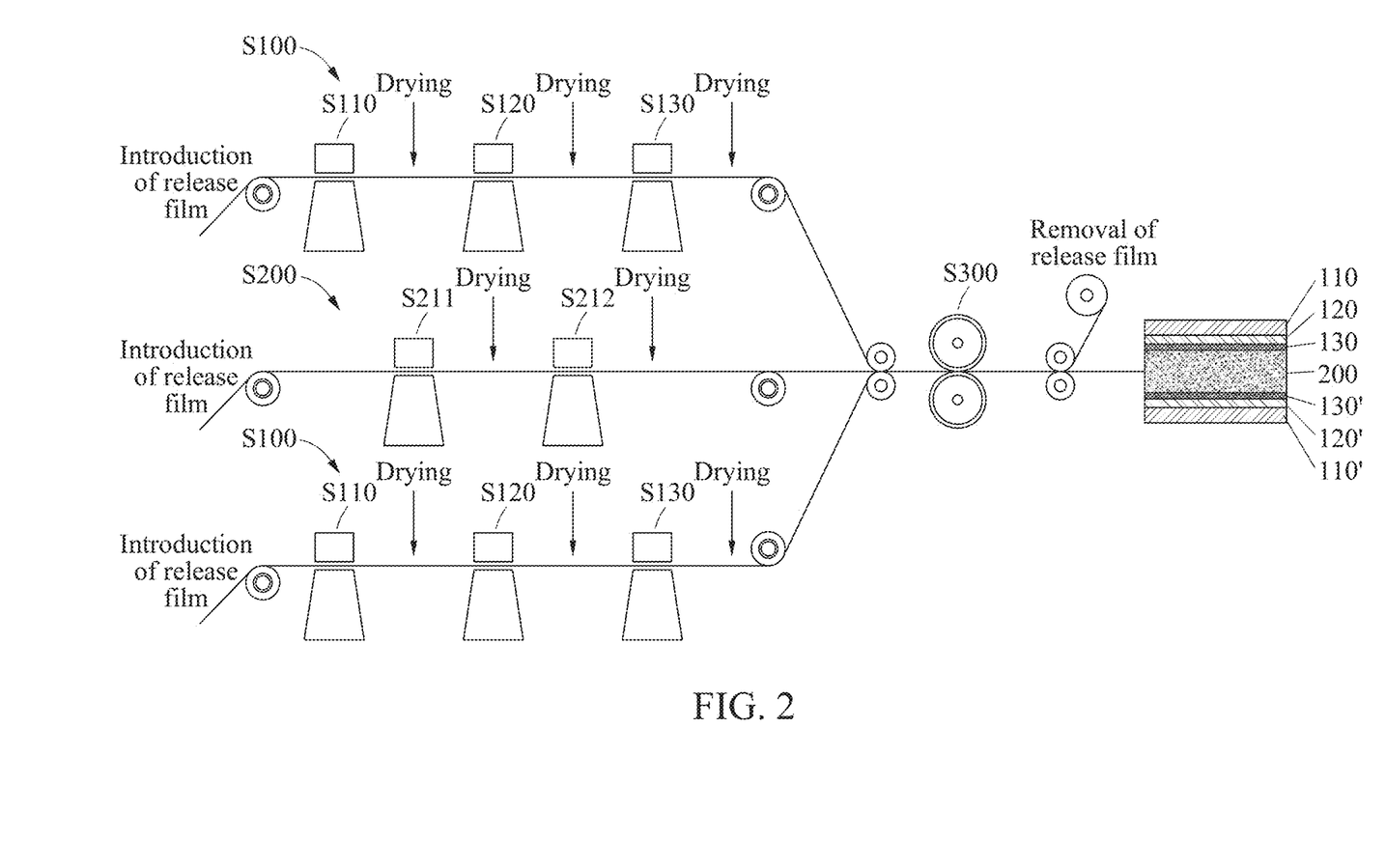
FIG. 2, according to an embodiment of the present invention, exemplarily illustrates a process of a method for manufacturing a membrane-electrode assembly according to the present invention.

According to an embodiment of the present invention, referring to FIG. 1 and FIG. 2, the step S100 of preparing an electrode layer may comprise step 110 of forming a catalyst layer, step 120 of forming a functional layer, and step 130 of forming an electrolyte layer, and each of the steps may be performed by a continuous process.

The step 110 of forming a catalyst layer comprises forming the catalyst layer by coating a catalyst coating composition on a base material, e.g., a release film, wherein the catalyst coating composition may comprise a catalytic material and a solvent, and may further comprise a hydrogen ion conductive binder resin.

The catalytic material may include catalytic materials without limitations if the catalytic materials are catalytic materials applicable to an electrode of a fuel cell in the technical field of the present invention. For example, the catalytic material may be a metal-carbon support catalyst. Although Examples of a metal in the metal-carbon support catalyst may include at least any one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu), the present invention is not limited thereto.

The carbon support is porous, and although the carbon support may include at least any one selected from the group consisting of carbon (C), carbon black, carbon nanotube (CNT), graphite, graphene, activated carbon, mesoporous carbon, carbon fiber and carbon nanowire, the present invention is not limited thereto.

The solvent comprises 10 wt % or more, 30 wt % or more, 40 wt % or more, or 40 wt % to 90 wt % of water, an organic solvent, or both thereof, and the catalyst coating composition comprises 1 wt % to 10 wt % of the hydrogen ion conductive binder resin. Hereinafter, the hydrogen ion conductive binder resin and the solvent will be described in more detail.

The step 120 of forming a functional layer may form a film by coating a functional layer coating composition on the electrode catalyst layer as a step of forming a functional layer on at least a portion on an electrode catalyst layer.

The functional layer coating composition may perform a protection layer role of protecting structure of the electrode material layer and a role as an adhesive supporting layer for an electrolyte layer since the functional layer coating composition has coating properties and insolubility on the electrode catalyst layer, allows a coating operation to be conducted well on the electrode catalyst layer by a simple process, and is not permeated (or absorbed) into the electrode material layer. Further, the electrolyte layer is well impregnated into a porous support as penetration of the electrolyte layer into an electrode layer is minimized, or the electrolyte layer is hardly penetrated into the electrode layer, and a uniform film of the electrolyte layer may be formed within a membrane-electrode assembly as an interfacial resistance between the electrolyte layer and the electrode layer is minimized.

The functional layer coating composition comprises a hydrogen ion conductive binder resin and a solvent, and may further comprise a functional additive including an antioxidant, a gas permeation adjusting agent, or both thereof. Namely, the functional layer coating composition may form a functional layer by performing a coating process after mixing the functional additive with a hydrogen ion conductive binder resin solution having coating properties and insolubility with respect to an electrode.

Further, the functional layer minimizes chemical and physical durability and interfacial resistance of a membrane- Poly(ether ether ketone) (S-PEEK), sulfonated poly(p-phenylene)s (S-PP), sulfonated polyimide (S-PI), sulfonated polysulfone (S-PS), sulfonated polyphenylsulfone to represented by the following chemical formula 2 and chemical formula 3, etc., the present invention is not limited thereto.

[Chemical Formula 2]

electrode assembly, maximizes penetration of the electrolyte layer into the porous support, and enables the functional additive to improve performance and function of the membrane-electrode assembly by introducing a hydrogen ion conductive binder resin, thereby improving contact compatibility between the electrode layer and the electrolyte layer.

Examples of the hydrogen ion conductive binder resin may include at least any one selected from the group consisting of a perfluorinated polymer, a sulfonated hydrocarbon-based polymer, a benzimidazole-based polymer, a polyimide-based polymer, a polyetherimide-based polymer, a polyether ketone-based polymer, a polyether ether ketone-based polymer, and a polyphenylquinoxaline-based polymer, and may preferably comprise a perfluorinated polymer having a low glass transition temperature. Further, the hydrogen ion conductive binder resin may include a hydrogen ion conductive polymer having a glass transition temperature of 100° C. to 150° C.

Although examples of the perfluorinated polymer may include Nafion (Dupont Corporation) represented by chemical formula 1, Flemion (Asahi Glass Co., Ltd), Asiplex (Asahi Chemical Co., Ltd), Dow XUS (Dow Chemical Corporation), Aquivion (Solvay Corporation), etc., the present invention is not limited thereto.

[Chemical Formula 1]

In chemical formula 1, m≥0 (For example, m=0 to 1), n=1 to 5, x=1 to 14, and y=200 to 1,000.

Although examples of the sulfonated hydrocarbon-based polymer may include sulfonated poly(arylene ether sulfone) (S-PES), sulfonated polybenzimidazole (S-PBI), sulfonated

In chemical formula 2, R is an inorganic cation selected from H, K, Li, Na, Rb and Cs, or an organic cation selected from $N^+R_1R_2R_3R_4$ (ammonium), $P^+R_1R_2R_3R_4$ (phosphonium), $N^+NR_1R_2R_3R_4R_5$ (imidazolium), $NH^+R_1R_2R_3R_4R_5$ (pyridinium), pyrrolidinium, and sulfonium;

X and Y are each a number within a range of 5 to 50;

n is an integer of 2 to 50; and $R_1$, $R_2$, $R_3$, $R_4$ and $R_5$, which are the same as or different from one another, are each independently a $C_1$ to $C_7$ straight-chained or branched alkyl group.

[Chemical Formula 3]

In chemical formula 3, R is an inorganic cation selected from H, K, Li, Na, Rb and Cs, or an organic cation selected from $N^+R_1R_2R_3R_4$ (ammonium), $P^+R_1R_2R_3R_4$ (phosphonium), $N^+NR_1R_2R_3R_4R_5$ (imidazolium), $NH^+R_1R_2R_3R_4R_5$ (pyridinium), pyrrolidinium, and sulfonium;

X and Y are each a number within a range of 5 to 50;

n is an integer of 2 to 50; and $R_1$, $R_2$, $R_3$, $R_4$ and $R_5$, which are the same as or different from one another, are each independently a $C_1$ to $C_7$ straight-chained or branched alkyl group.

The hydrogen ion conductive binder resin is included in the functional layer coating composition in an amount range of 1 wt % to 20 wt %, 1 wt % to 15 wt %, or 1 wt % to 10 wt %. When the hydrogen ion conductive binder resin is included in the functional layer coating composition in the above-mentioned amount range, the hydrogen ion conductive binder resin is preferable since the hydrogen ion conductive binder resin can perform a role of reducing interfacial resistance with the electrode layer while improving adhesive strength with an electrolyte membrane on the top surface of an electrode layer and protecting the electrode layer.

The hydrogen ion conductive binder resin is applied to an aqueous suspension or an organic resin solution, and the hydrogen ion conductive binder resin may be included in the aqueous suspension in an amount of 2 wt % or more, 10 wt % or more, 20 wt % or more, or 30 wt % or more. Further, the functional layer coating composition may adjust fraction of the hydrogen ion conductive binder resin by adding a residual amount of water and/or an organic solvent to the functional layer coating composition.

The solvent may give a help in the formation of a functional coating composition comprising a nonaqueous solvent and having excellent coating properties and insolubility with respect to a catalyst layer (electrode).

The nonaqueous solvent is a nonaqueous alcohol, and, for example, the nonaqueous solvent may include at least any one selected from the group consisting of a primary alcohol, a secondary alcohol and a tertiary alcohol having 4 to 20 carbon atoms. More specifically, the nonaqueous solvent may include at least any one selected from the group consisting of: a primary alcohol such as butane-1-ol (C4), pentane-1-ol (C5), hexane-1-ol (C6), heptane-1-ol (C7), octane-1-ol (C8), nonane-1-ol (C9), and decane-1-ol (C10); a secondary alcohol such as butane-2-ol (C4), pentane-2-ol (C5), hexane-2-ol (C6), heptane-2-ol (C7), 2-methylbutane-1-ol (C5), and cyclohexanol (C6); and a tertiary alcohol such as 2-methylpropane-2-ol (C4), 2-methylbutane-2-ol (C5), 2-methylpentane-2-ol (C6), 2-methylhexane-2-ol (C7), 2-methylheptane-2-ol (C8), 3-methylpentane-3-ol (C6), and 3-methyloctane-3-ol (C9).

The nonaqueous solvent may be included in the functional layer coating composition in an amount range of 1 wt % to 10 wt % or 2 wt % to 5 wt %, and the amount range of the solvent is preferable since coating properties with respect to the top surface of an electrode layer can be realized when the solvent is included in the functional layer coating composition within the amount range.

The antioxidant from the functional additives may include at least one selected from the group consisting of: metal ions such as cerium (III) ions and manganese (III) ions; metal oxides such as cerium oxide ($CeO_2$) and manganese oxide ($MnO_2$); and cerium nanoparticles. The antioxidant may be included in an amount of 0.5 mol % to 10 mol % based on the concentration of an ionic functional group of the hydrogen ion conductive binder resin, e.g., a sulfonic acid group.

The gas permeation adjusting agent from the functional additives may include a gas permeation reducing agent. The gas permeation reducing agent is metal-supported carbon particles, and the metal is a metal, an alloy and/or a metal carbide including at least one selected from the group consisting of platinum (Pt), nickel (Ni), and iron (Fe). For example, the metal may be platinum (Pt), nickel (Ni) or iron (Fe) as a single metal, iron-cobalt (FeCo) as a double metal alloy, iron-tin-copper (FeSnCu) as a triple metal alloy, tungsten-carbide (WC) as a metal carbide, or the like.

The gas permeation reducing agent may be included in an amount of 0.1 mol % to 10 mol %, 0.1 mol % to 5 mol %, or 0.1 mol % to 3 mol % based on the concentration of an ionic functional group of the hydrogen ion conductive binder resin, e.g., a sulfonic acid group. The amount range of the gas permeation reducing agent is preferable since the gas permeation reducing agent can suppress permeation of hydrogen gas generated during operation of a fuel cell when the gas permeation reducing agent is included within the amount range.

A mol % ratio of the antioxidant to the gas permeation adjusting agent may be 1:0.01 to 1:20, 1:0.01 to 1:10, 1:0.1 to 1:10, or 1:0.1 to 1:5.

A mol % ratio of the hydrogen ion conductive binder resin to the antioxidant, the gas permeation adjusting agent, or both thereof may be in a range of 1:0.001 to 1:0.2, or 1:0.01 to 1:0.1. If the functional additives are included within the range, the hydrogen ion conductive binder resin is mixed well with the functional additives, a thin and uniform functional layer is formed, and the functional additives improve performance and function of a membrane-electrode assembly and can prevent penetration of an electrolyte layer into a catalyst layer.

The functional layer may be formed to a thickness range of 1 µm to 10 µm, or 1 µm to 5 µm. If the functional layer is within the thickness range, the functional layer minimizes interfacial resistance, and can prevent durability deterioration of a membrane-electrode assembly or performance deterioration of a fuel cell due to an increase in thickness.

The step 130 of forming an electrolyte layer comprises forming an electrolyte membrane on at least a portion on a functional layer by using an electrolyte layer coating composition, wherein, as the electrolyte membrane is formed on the functional layer, the electrolyte membrane minimizes damage of an electrode layer in a hot-pressing process, and may be easily penetrated into a porous support.

The electrolyte layer coating composition may comprise a hydrogen ion conductive binder resin and a nonaqueous solvent. In the electrolyte layer coating composition, the hydrogen ion conductive binder resin is the same as mentioned in the functional layer, and components and/or content of the hydrogen ion conductive binder resin may be the same as or different from those of the functional coating composition. Further, the electrolyte layer coating composition may form a pure electrolyte layer to be penetrated into a porous support.

The hydrogen ion conductive binder resin may be included in the electrolyte layer coating composition in an amount of 1 wt % to 40 wt %, 5 wt % to 40 wt %, or 1 wt % to 30 wt %. The hydrogen ion conductive binder resin is applied to an aqueous suspension, and an ionomer may be included in the aqueous suspension in an amount of 2 wt % or more, 10 wt % or more, 20 wt % or more, or 30 wt % or more.

Further, the electrolyte layer coating composition may adjust fraction of the hydrogen ion conductive binder resin by adding a residual amount of water and/or an organic solvent to the functional layer coating composition.

The solvent, which is a nonaqueous solvent mentioned in the functional layer, may be included in the electrolyte layer coating composition in an amount range of 1 wt % to 20 wt %, or 2 wt % to 10 wt %. If the solvent is included in the electrolyte layer coating composition within the amount range, the solvent may improve impregnation ratio of the electrolyte layer coating composition into the porous support and adhesive strength between the membrane-electrode assembly and the porous support, and may form an electrolyte membrane comprised of pure electrolyte components in mild conditions.

The electrolyte layer is formed to a thicker thickness than the functional layer, and may be formed to a thickness range of more than 1 µm to not more than 30 µm, 5 µm to 15 µm, or 8 µm to 10 µm by considering penetration of the electrolyte into the porous support, adhesive strength between the membrane-electrode assembly and the porous support, durability of the membrane-electrode assembly, and others. If the electrolyte layer is within the thickness range, the electrolyte layer increases impregnation of the electrolyte layer into the porous support, and can prevent durability deterioration of the membrane-electrode assembly or performance deterioration of a fuel cell due to an increase in thickness. Preferably, a thickness range of the functional layer to the electrolyte layer may be 1:0.5 to 1:10.

The coating process in the step S100 of preparing an electrode layer may be performed by using dip coating, spin coating, spray coating, doctor blade, slot die coating, bar coating, solution casting, etc. The step S100 of preparing an electrode layer further comprises a step of performing a drying process after each of coating steps, and the drying process may be performed by using hot air, heating, vacuum, light, and the like at a temperature of 30° C. to 200° C.

According to an embodiment of the present invention, the step S200 of preparing a porous support layer is a step of preparing an ion exchange membrane applicable to a fuel cell by the configuration of a membrane-electrode assembly, preferably a step of enabling a hydrogen ion conductive binder resin-impregnated reinforced composite membrane to be formed in the porous support by pretreating a reinforced composite membrane with a hydrogen ion conductive binder resin solution.

Referring to FIG. 1 and FIG. 2, the step S200 of preparing a porous support layer may comprise step 210 of pretreating (prewetting) the porous support by impregnating the porous support with a pretreatment composition.

The pretreatment step 210 may comprise dipping the porous support in the pretreatment composition at a temperature of room temperature or more, or 30° C. to 100° C. for 1 minute or more, or 10 minutes to 10 hours. A porous support in a moisturized state or a semi-dried state according to a degree of impregnation of the pretreatment solution may be formed by adjusting such temperature and time. The pretreatment composition may be in a state of a solution, a slurry, an emulsion, a colloid, or the like.

The pretreatment step 210 may comprise first pretreatment step 211 and second pretreatment step 212. For example, the pretreatment step 210 may comprise performing a process of dipping the porous support in a first pretreatment composition to dry the porous support, and then dipping the dried porous support in a second pretreatment composition.

The first pretreatment step 211 comprises dipping the porous support in the first pretreatment composition and drying the porous support, wherein the first pretreatment composition comprises an organic solvent, and impurities may be removed by drying the porous support by a vacuum drying method after dipping the porous support in the first pretreatment composition.

The second pretreatment step 212 enables the second pretreatment composition to form a porous support in a moisturized state or semi-dried state by dipping a dried porous support passing through the first pretreatment step 211 in the second pretreatment composition.

The semi-dried state may be a state that, after impregnating 50% or more or 70% or more of the second pretreatment composition into the porous support, less than 50% or 40% or less of a solvent is remained in the porous support by performing a drying process with respect to the total volume of the porous support. Further, the moisturized state may be a state that 50% or more or 70% or more of the second pretreatment composition is impregnated into the porous support with respect to the total volume of the porous support.

The second pretreatment composition may comprise a hydrogen ion conductive binder resin and an organic solvent, and the hydrogen ion conductive binder resin may be included in the second pretreatment composition in an amount of 0.5 wt % to 20 wt %.

The amount of the hydrogen ion conductive binder resin may be adjusted by adding water, an organic solvent, or both thereof. The hydrogen ion conductive binder resin is the same as mentioned in the functional layer.

The organic solvent may include an aqueous organic solvent and/or a nonaqueous organic solvent, and the organic solvent may include an aprotic solvent, alcohol, or both thereof. The organic solvent may be included in the second pretreatment composition in an amount of 2 wt % or more, 2 wt % to 70 wt %, or 20 wt % to 60 wt %.

A mass ratio of the hydrogen ion conductive binder suspension to alcohol may be 1:0.1 to 1:5, 1:0.2 to 1:2, or 1:1.

When two or more of the organic solvents are applied, a ratio of one organic solvent to the remaining organic solvents may be 1:10 to 1:30, 1:20 to 1:30, or 1:25.

Examples of the alcohol may include a primary alcohol, a secondary alcohol and/or a tertiary alcohol having 1 to 20 carbon atoms. For example, the alcohol may include at least one selected from the group consisting of: a monohydric alcohol such as methanol, ethanol, propan-1-ol, or propan-2-ol; a dihydric alcohol such as ethylene glycol, diethylene glycol, dipropylene glycol, tetramethylene glycol, or pentamethylene glycol; and a trihydric alcohol such as glycerol.

Although examples of the aprotic solvent may include at least any one selected from the group consisting of 1-methyl-2-pyrrolidone (NMP), dimethylacetamide (DMAc), N,N-dimethylacetamide (DMA), N,N-dimethylformamide (DMF), hexamethylphosphoramide (HMPA), 1,3-dimethyl-2-imidazolidinone (DMI), dimethyl sulfoxide (DMSO), tetrahydrofuran, glycerol, toluene, acetic acid, acetone, cyclohexane, methylcyclohexane, hexane, heptane, octane, nonane, decane, dodecane, decaline, methyl ethyl ketone, benzene, toluene, ethylbenzene, and xylene, the present invention is not limited thereto.

The second pretreatment composition may further comprise the impregnation accelerator, and the impregnation accelerator may be included in the second pretreatment composition in an amount of 0.01 wt % to 10 wt %, 0.1 wt % to 5 wt %, or 0.2 wt % to 1 wt %. Although the impregnation accelerator may include at least any one selected from nonionic surfactants such as 2-(perfluorohexyl)ethanol, 3-(perfluorobutyl)propanol, perfluoro octanol, Triton X-100, TWEEN 80 and Brij™-35, or ionic surfactants such as cetrimonium bromide and sodium dodecyl benzene sulfonate, the present invention is not limited thereto.

The porous support may include porous supports without limitations if the porous supports are porous supports applicable to a fuel cell. Preferably, the porous support may include at least any one selected from the group consisting of polysulfone, poly(arylene ether sulfone), poly(arylene ether ketone), polybenzimidazole, polybenzothiazole, polypyrrolone, polyetheretherketone, polyphosphazene, polytetrafluoroethylene (PTFE), polyethylene (PE), polyvinylidene fluoride (PVdF), polyethylene terephthalate (PET), polyimide (PI), polypropylene (PP), cellulose, and nylon. More preferably, the porous support may include polytetrafluoroethylene (PTFE) and polyethylene (PE). The porous support may additionally include a polymer used as an ion exchange membrane. Although examples of the polymer may include at least any one selected from the group consisting of poly(ethylene oxide) (PEO), poly(propylene oxide) (PPO), polyethyleneimine (PEI), polyethylene sulfide (PES), polyvinyl acetate (PVAc), poly(ethylene succinate) (PESc), polyvinylidene fluoride (PVdF), polyacrylonitrile (PAN), polymethyl methacrylate (PMMA), polyvinylchloride (PVC), polyetherketone (PEK), and polybenzimidazole (PBI), the present invention is not limited thereto.

Referring to FIG. 2, the step S300 of performing a hot-pressing process according to an embodiment of the present invention may comprise positioning an electrode layer on each of both surfaces of a pretreated porous support to perform a hot-pressing process (or a roll lamination process) in a state that the pretreated porous support is inserted into the electrode layers, and removing a release film to form a membrane-electrode assembly by a continuous process.

The electrode layer is disposed such that the pretreated porous support comes into contact with an electrolyte layer of the electrode layer, and the porous support may be in a moisturized state or a semi-dried state as described in the step 200.

Finally, the membrane-electrode assembly may include a porous support layer 200 in which at least a portion of electrode layers 110, 110', which are each a cathode and an anode, functional layers 120, 120' and electrolyte layers 130, 130' is impregnated. The functional layer 120 and the functional layer 120' may be the same as or different from each other, and the electrolyte layer 130 and the electrolyte layer 130' may be the same as or different from each other. Manufacturing processes, components, or both thereof may be the same as or different from each other.

The step S300 of performing a hot-pressing process comprises performing a roll lamination process by using the pretreated porous support and the above-mentioned electrode layer including the functional layers and the electrolyte layers.

Therefore, the step S300 of performing a hot-pressing process may provide a membrane-electrode assembly (MEA) which improves electrolyte impregnation properties and membrane density in the porous support, and which is a core part of a polymer electrolyte fuel cell having improved physical and chemical durability and performance.

The step S300 of performing a hot-pressing process may comprise performing a roll lamination process at condition of at least one of a temperature of 100° C. to 200° C., a pressure of 1 kgf/cm$^2$ to 100 kgf/cm$^2$, or a speed of 1 mm/sec to 100 mm/sec.

The present invention relates to a membrane-electrode assembly, and the membrane-electrode assembly may include: a porous support; and an electrode layer which is positioned on both surfaces of the porous support, wherein the electrode layer includes: an electrode catalyst layer; a functional layer which is formed on the electrode catalyst layer; and an electrolyte layer which is formed on the functional layer.

Here, at least a portion of the electrolyte layer is impregnated in a thickness direction of the porous support. 1% or more, 5% or more, 10% or more, 1% to 20%, 1% to 50%, or 1% to 70% of the electrolyte layer may be impregnated in a thickness direction of the porous support with respect to the total thickness of the electrolyte layer, and the electrolyte layer may not impregnated into the electrode catalyst layer. The functional layer may be formed to a thickness of 1 μm to 10 μm in the membrane-electrode assembly.

A supported amount of a catalyst of the membrane-electrode assembly, e.g., a supported amount of a catalyst metal such as platinum or the like may be 0.2 mg/cm$^2$ or more.

The present invention may provide a fuel cell including a membrane-electrode assembly according to the present invention. For example, the fuel cell including a membrane-electrode assembly according to the present invention may be a polymer electrolyte fuel cell. The polymer electrolyte fuel cell may be a unit cell, a stack and the like, may include a configuration applied in a technical field of the present invention, and is not specifically described.

Hereinafter, the present invention will be described in more detail by Examples and Comparative Examples.

However, the following Examples just exemplify the present invention, and the contents of the present invention are not limited to the following Examples.

Example 1: MEA Manufacturing-Alcohol Based Support Pretreatment Solution Including a Perfluorinated Reinforced Composite Membrane Manufacturing of a Functional Layer Coated Electrode According to configuration of the following table 1, a catalyst layer coating composition was prepared by using a carbon-supported platinum catalyst (Pt/C), and a solution including Aquivion resin (Aquivion D83), i.e., an aprotic solvent (N-methyl-2-pyrrolidone, NMP)-based hydrogen ion conductive binder. The catalyst layer coating composition comprises 35 wt % of Aquivion ionomer with respect to the total solid.

TABLE 1

| Components | Pt/C | Aquivion solid | NMP |
|---|---|---|---|
| Wt % | 6.5 | 3.5 | 90 |

10 wt % of a functional layer coating composition was prepared by adding 5 wt % of hexane-1-ol alcohol to an Aquivion resin (Aquivion D83) suspension including 76 wt % of water, i.e., a hydrogen ion conductive binder, adding 2.5 mol % of cerium (III) ions (an antioxidant) and 1 mol % of platinum-supported carbon particles (a gas permeation reducing agent) to the suspension based on the concentration of a sulfonic acid group of the polymer, and adding water to the suspension. After forming a catalyst layer by coating a catalyst layer coating composition to a predetermined thickness on a release paper by a doctor blade method, a functional layer coating composition was coated on the catalyst layer on the catalyst layer in the same manner. The catalyst layer and ionomer layer had thicknesses of to 10 μm and 3 μm respectively.

Forming an Electrolyte Layer on the Top of a Functional Layer-Coated Electrode 10 wt % of an electrolyte layer coating composition was prepared by adding 5 wt % of hexane-1-ol alcohol to an Aquivion resin (Aquivion D83) suspension including 76 wt % of water, i.e., a hydrogen ion conductive binder and adding water to the suspension. An electrolyte layer was coated on a functional layer by a doctor blade method. The electrolyte layer had a thickness of 10 μm.

Pretreating a Polytetrafluoroethylene Porous Support

After dipping a porous polytetrafluoroethylene (PTFE) support in ethanol for 30 minutes, impurities inside pores of the PTFE support were removed by vacuum-drying the PTFE support at 50° C.

After adding 46 wt % of ethanol and 2-propanol to an Aquivion resin (Aquivion D83) suspension containing 76 wt % of water at a mixing ratio of 1:22, 2 wt % of an alcohol-based solution composition was prepared by adding 0.4 wt % of 2-(perfluorohexyl)ethanol as an impregnation accelerator to the suspension and then adding water to the suspension. The PTFE support was moisturized by dipping the PTFE support in the prepared solution composition for 10 minutes.

Manufacturing of a Membrane-Electrode Assembly

After disposing a functional layer-coated electrode on upper and lower rolls and disposing the rolls such that a pretreated porous support is inserted between the functional layer-coated electrodes, a membrane-electrode assembly was manufactured by simultaneously performing a roll lamination (or hot-pressing) process. The roll lamination process was performed to a speed of 1 mm/sec at a temperature of 120° C. and a pressure of 10 kgf/cm$^2$.

Example 2: MEA Manufacturing-Nonaqueous Support Pretreatment Solution Including a Perfluorinated Reinforced Composite Membrane Pretreatment of a Polytetrafluoroethylene Porous Support After dipping a porous polytetrafluoroethylene (PTFE) support in ethanol for 30 minutes, impurities inside pores of the PTFE support were removed by vacuum-drying the PTFE support at 50° C.

After substituting solvent of an Aquivion resin (Aquivion D83) suspension containing 76 wt % of water by N-methyl-2-pyrrolidone (NMP) as an aprotic solvent, 2 wt % of a nonaqueous solution composition was prepared by adding 0.4 wt % of 2-(perfluorohexyl)ethanol as an impregnation accelerator to the solvent-substituted suspension. The PTFE support was moisturized by dipping the PTFE support in the prepared solution composition for 10 minutes.

Manufacturing of a Membrane-Electrode Assembly

An MEA was manufactured through a roll lamination process having the same conditions as in Example 1 by using a functional layer-coated electrode of Example 1 and a porous support pretreated with the prepared nonaqueous Aquivion solution.

Example 3: MEA Manufacturing-Nonaqueous Support Pretreatment Solution Including a Hydrocarbon-Based Reinforced Composite Membrane Pretreatment of a Polyethylene Porous Support After dipping a porous polyethylene (PE) support in ethanol for 30 minutes, impurities inside pores of the PE support were removed by vacuum-drying the PE support at 50° C.

After dissolving sulfonated poly(arylene ether sulfone) (SPES 50) having a degree of sulfonation of 50% as a commercial hydrocarbon polymer into N-methyl-2-pyrrolidone (NMP) as an aprotic solvent, 2 wt % of a solution composition was prepared by adding 0.4 wt % of 2-(perfluorohexyl)ethanol as an impregnation accelerator to the commercial hydrocarbon polymer dissolved with the aprotic solvent. The PE support was moisturized by dipping the PE support in the prepared solution composition for 10 minutes.

Manufacturing of a Membrane-Electrode Assembly

An MEA was manufactured through a roll lamination process having the same conditions as in Example 1 by using a functional layer-coated electrode of Example 1 and a porous support pretreated with a solution of sulfonated poly(arylene ether sulfone) (SPES 50) having a degree of sulfonation of 50% as the hydrocarbon polymer.

Comparative Example 1: Manufacturing an MEA Including a Reinforced Composite Membrane by a Decal Process Manufacturing of Perfluorinated Reinforced Composite Membrane A perfluorinated reinforced composite membrane was manufactured by impregnating internal volume of a porous polytetrafluoroethylene (PTFE) support with a hydrogen ion conductive perfluorinated polymer (Aquivion D83). The reinforced composite membrane had a thickness of 27 μm.

Manufacturing of a Membrane-Electrode Assembly

An MEA was manufactured through an existing decal process by using a functional layer-uncoated electrode and the manufactured reinforced composite membrane.

MEA manufacturing using the decal process comprises transferring a catalyst layer to a polymer electrolyte film at conditions of 120° C. and 40 kgf/cm$^2$ to obtain a manufactured MEA. A platinum-supported amount of such manufactured MEA was maintained to about 0.25 mg/cm$^2$.

Comparative Example 2: Manufacturing an MEA by Using an Additive-Free Functional Layer Coated Electrode Manufacturing of a Functional Layer-Coated Electrode 10 wt % of a functional layer coating composition was prepared by excluding two additives of cerium (III) ions (an antioxidant) and platinum-supported carbon particles (a gas permeation reducing agent) from a functional layer coating composition of Example 1, adding 5 wt % of a hexane-1-ol alcohol to the functional layer coating composition, and additionally adding water to the functional layer coating composition.

The functional layer coating composition having two additives excluded therefrom was coated on a catalyst layer in the same manner as in Example 1. The catalyst layer and ionomer layer had thicknesses of 10 μm and 3 μm respectively.

Manufacturing of a Membrane-Electrode Assembly

An MEA was manufactured through a roll lamination (hot-pressing) process having the same conditions as in Example 1.

Comparative Example 3: Manufacturing an MEA by Using a Nonaqueous Electrolyte Composition-Coated Electrode Manufacturing of an Electrolyte-Coated Electrode The electrolyte layer coating composition was coated on an electrode by a doctor blade method after preparing 10 wt % of an electrolyte layer coating composition by substituting a solvent of an Aquivion resin (Aquivion D83) suspension containing 76 wt % of water by N-methyl-2-pyrrolidone (NMP).

Manufacturing of a Membrane-Electrode Assembly

An MEA was manufactured through a roll lamination (hot-pressing) process having the same conditions as in Example 1.

Comparative Example 4: Manufacturing an MEA by Using a Non-Pretreated Porous Support Manufacturing of a Membrane-Electrode Assembly An MEA was manufactured through a roll lamination process having the same conditions as in Example 1 by using a functional layer-coated electrode of Example 1 and a non-pretreated porous support.

Results (1) Scanning Electron Microscope Test Analysis

Improving Penetration Prevention of an Electrolyte by a Functional Layer

Figure 3:
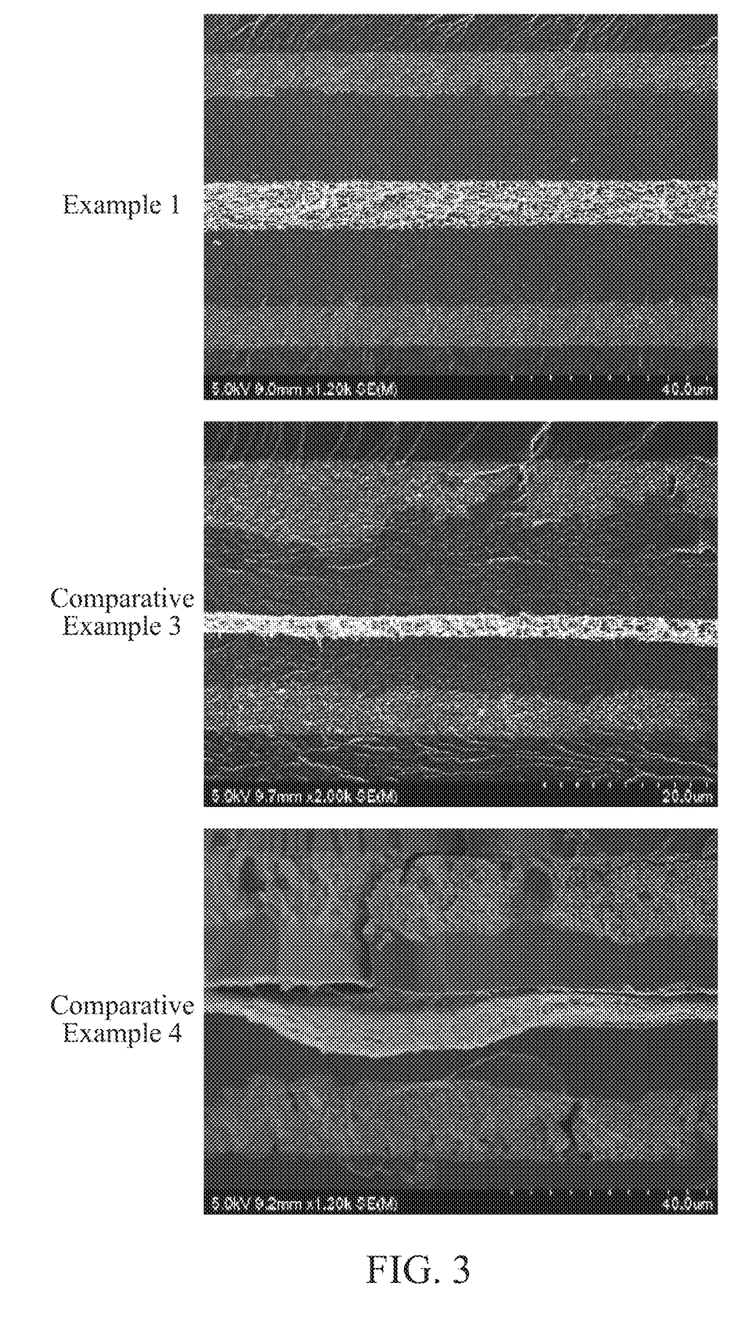
FIG. 3, according to an embodiment of the present invention, illustrates cross sectional SEM (scanning electron microscope) images of membrane-electrode assemblies (MEA) manufactured in Example and Comparative Examples of the present invention.

After confirming membrane-electrode interfaces of MEAs manufactured according to Example 1 and Comparative Example 3 by a scanning electron microscope to confirm that penetration of an electrolyte into an electrode is prevented by introducing a functional layer, comparison results are shown in FIG. 3 by comparing the membrane-electrode interfaces of the MEAs. It can be seen that a structure in which a membrane and an electrode are stacked to a uniform thickness is formed in the MEA of Example 1, while the electrode has a nonuniform thickness as an electrolyte is penetrated into an electrode in the MEA of Comparative Example 3.

Improving Impregnation Ratio of an Electrolyte by Pretreatment of a Porous Support In order to confirm that impregnation ratio of an electrolyte had been improved by pretreatment of a porous support, membrane-electrode interfaces of MEAs manufactured according to Example 1 and Comparative Example 4 were confirmed by a scanning electron microscope (FIG. 3). While a sample-cut cross section can be confirmed as an electrolyte is impregnated into a porous support in Example 1, a figure that the support is torn and separated into two layers can be seen during cutting of a sample as the electrolyte is not sufficiently impregnated into the porous support in Comparative Example 4.

(2) Performance Evaluation of MEA Unit Cells

Figure 4:
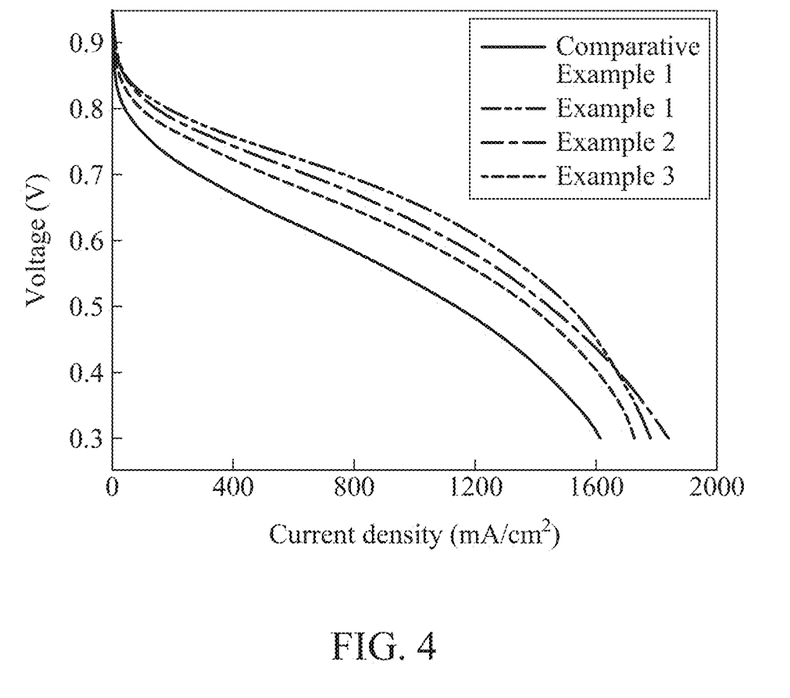
FIG. 4, according to an embodiment of the present invention, illustrates comparison results obtained by comparing performances of a battery according to types of a manufacturing process and a reinforced composite membrane of membrane-electrode assemblies (MEA) manufactured in Examples and Comparative Example of the present invention.

Performance Evaluation According to Types of Manufacturing Processes and Reinforced Composite Membranes After evaluating performances of unit cells of MEAs manufactured according to Examples 1, 2 and 3, and Comparative Example 1, performances according to types of manufacturing processes and reinforced composite membranes are compared in FIG. 4. As an MEA according to Example 1 has an improved current density of 1274 mA/cm$^2$ although an MEA according to Comparative Example 1 has a current density of 717 mA/cm$^2$ at 0.6 V, it is confirmed that a roll lamination (hot-pressing) process is more effective than a decal process in improvement of MEA performance. Further, although it is confirmed that performance of a porous support having a current density of 1118 mA/cm$^2$ pretreated with a nonaqueous solution according to Example 2 is somewhat lower than that of a porous support having a current density of 1274 mA/cm$^2$ pretreated with an alcohol-based solution according to Example 1, it is determined that the porous support according to Example 2 has a performance level similar to that of the porous support according to Example 1.

Meanwhile, although an MEA according to Example 1 and an MEA according to Example 3 were manufactured by the same roll lamination (hot-pressing) process, the MEA according to Example 1 and the MEA according to Example 3 show different performances according to types of reinforced composite membranes. Although it is confirmed that an MEA including a hydrocarbon-based reinforced membrane according to Example 3 having a current density of 1017 mA/cm$^2$ at 0.6 V has somewhat lower performance than that of an MEA including a perfluorinated reinforced membrane according to Example 1, it is determined that the MEA according to Example 3 also has a performance level similar to that of the MEA according to Example 1.

(3) Confirming a Gas Permeation Reducing Effect Due to a Functional Layer

Figure 5:
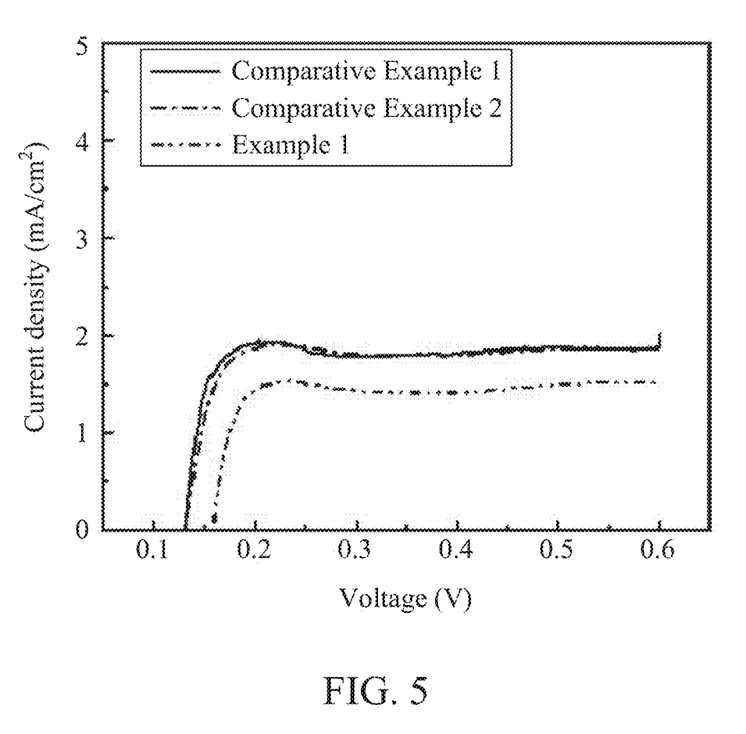
FIG. 5, according to an embodiment of the present invention, illustrates comparison results obtained by comparing hydrogen crossover current densities of the battery according to whether a functional layer is or is not and whether an additive is or is not within the functional layer in membrane-electrode assemblies (MEA) manufactured in Example and Comparative Examples of the present invention.

A gas permeation reducing effect due to a functional layer was confirmed through hydrogen crossover current density. Therefore, hydrogen permeability measuring results of MEAs manufactured according to Example 1 and Comparative Examples 1 and 2 are compared in FIG. 5. Although the MEAs manufactured according to Comparative Examples 1 and 2 have the same hydrogen crossover current density of 1.8 mA/cm$^2$ at 0.4 V, the MEA manufactured according to Examples 1 has a reduced hydrogen crossover current density of 1.4 mA/cm$^2$. Therefore, the effect of a gas permeation adjusting agent dispersed in a functional layer due to a decrease in the hydrogen crossover current density has been verified.

(4) Effect of Improving Physical and Chemical Durability Due to a Functional Layer An oxidation preventing effect obtained by a functional layer was evaluated through a physical and chemical accelerated degradation test protocol suggested by U.S. Department of Energy (DOE), and an open circuit voltage (OCV) combined wet-dry cycling test. The OCV combined wet-dry cycling test was conducted at a condition of supplying hydrogen fuel and air as one cycle having a temperature of 90° C. and a relative humidity of 0% RH (30 seconds)/100% RH (45 seconds).

Figure 6:
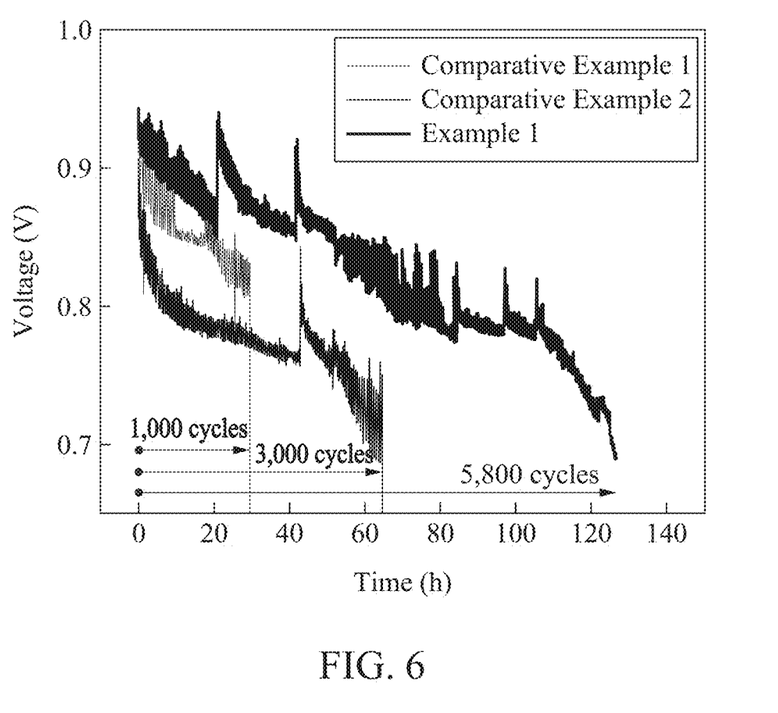
FIG. 6, according to an embodiment of the present invention, illustrates comparison results obtained by comparing OCV changes and wet-type/dry-type cycle numbers of the battery according to whether a functional layer is or is not and whether an additive is or is not within the functional layer in membrane-electrode assemblies (MEA) manufactured in Example and Comparative Examples of the present invention.

Results of measuring OCV changes and cycle numbers according to time of MEAs manufactured according to Example 1 and Comparative Examples 1 and 2 were compared in FIG. 6. In a functional layer-free MEA manufactured according to Comparative Example 1, as performance after 1,000 cycles is rapidly reduced, the cycle number is finished, and OCV is maintained for 21 hours. On the other hand, an MEA which does not include additives of an antioxidant and a gas permeation adjusting agent and has a functional layer manufactured according to Comparative Example 2 has an effect of improving durability to a certain extent by finishing the cycle number after 3,000 cycles, and maintaining an OCV for 64 hours. In contrast, a process of repeating 5,800 cycles while relatively stably maintaining the OCV for 118 hours was performed in an MEA having a functional layer including two additives manufactured according to Example 1. While the OCVs of the MEAs manufactured according to Comparative Examples 1 and 2 are reduced at rates of 6.2 mV/h and 3.0 mV/h respectively, the OCV of the MEA manufactured according to Examples 1 is more slowly reduced at a rate of 1.6 mV/h. These results imply that introduction of a functional layer containing the antioxidant improves chemical durability of a polymer fuel cell, and enhances interfacial stability between an electrode and an electrolyte membrane, thereby greatly improving mechanical durability of the polymer fuel cell.

Although the above-mentioned Examples have been described by limited Examples and drawings, those skilled in the art may apply various modifications and alterations from the above-mentioned description. For example, appropriate results can be achieved although described techniques are carried out in a different order from a described method, and/or described elements are combined or mixed in a different form from the described method, or replaced or substituted with other elements or equivalents. Therefore, other embodiments, other Examples, and equivalents to patent claims belong to the scope of the patent claims to be described later.

What is claimed is:

1. A method for manufacturing a membrane-electrode assembly, the method comprising:
    forming an electrode layer;
    preparing a porous support layer; and
    positioning the electrode layer on each of both surfaces of the porous support layer, and hot-pressing the electrode layer positioned on the both surfaces of the porous support layer,
    wherein the forming of the electrode layer comprises:
       forming a functional layer including a hydrogen ion conductive binder resin on at least a portion of an electrode catalyst layer; and
       forming an electrolyte layer on at least a portion of the functional layer, wherein the preparing of the porous support layer comprises performing a pretreatment process by impregnating the porous support layer with a pretreatment composition,
wherein the performing of the pretreatment process comprises dipping the porous support layer in the pretreatment composition at a temperature of approximately 1° C. to 80° C. for 1 minute to 60 minutes,
wherein the dipping of the porous support layer in the pretreatment composition comprises:
dipping the porous support layer in a first pretreatment composition and then drying the porous support layer; and
dipping the porous support layer after drying in a second pretreatment composition, and
wherein the porous support layer after the performing of the pretreatment process is in a state that the porous support layer is moisturized or semi-dried by the second pretreatment composition.

2. The method of claim 1, wherein the functional layer further comprises a functional additive including an antioxidant, a gas permeation adjusting agent, or both thereof,
wherein the antioxidant includes at least any one selected from the group consisting of cerium (III) ions, manganese (III) ions, cerium oxide ($CeO_2$), manganese oxide ($MnO_2$), and cerium nanoparticles, and
wherein the gas permeation adjusting agent includes metal-supported carbon particles, and
wherein the metal is a single metal or alloy comprising at least any one selected from the group consisting of platinum (Pt), nickel (Ni), and iron (Fe).

3. The method of claim 2, wherein a ratio (mol %) of the antioxidant to the gas permeation adjusting agent is 1:0.01 to 1:20, and
wherein a ratio (mol %) of the hydrogen ion conductive binder resin to the antioxidant, the gas permeation adjusting agent, or both thereof is 1:0.001 to 1:0.2.

4. The method of claim 1, wherein the functional layer has a thickness of 1 μm to 10 μm.

5. The method of claim 1, wherein the hydrogen ion conductive binder resin comprises at least any one selected from the group consisting of a perfluorinated polymer, a sulfonated hydrocarbon-based polymer, a benzimidazole-based polymer, a polyimide-based polymer, a polyetherimide-based polymer, a polyether ketone-based polymer, a polyether ether ketone-based polymer, and a polyphenylquinoxaline-based polymer.

6. The method of claim 1, wherein the forming of the electrolyte layer on the at least a portion of the functional layer comprises:
preparing an electrolyte layer coating composition comprising a hydrogen ion conductive binder resin and a nonaqueous solvent; and
coating the coating composition on the at least a portion of the functional layer.

7. The method of claim 6, wherein the hydrogen ion conductive binder resin is included in an amount of 1 wt % to 40 wt % in the electrolyte layer coating composition, and the hydrogen ion conductive binder resin of the electrolyte layer is the same as or different from the hydrogen ion conductive binder resin of the functional layer.

8. The method of claim 6, wherein the nonaqueous solvent includes at least any one selected from the group consisting of primary alcohol, secondary alcohol and tertiary alcohol having 4 to 20 carbon atoms.

9. The method of claim 1, wherein a thickness ratio of the functional layer to the electrolyte layer is 1:0.5 to 1:10.

10. The method of claim 1, wherein the first pretreatment composition comprises an organic solvent, and
wherein the second pretreatment composition comprises the hydrogen ion conductive binder resin and the organic solvent.

11. The method of claim 1, wherein the second pretreatment composition comprises 0.5 wt % to 20 wt % of the hydrogen ion conductive binder resin.

12. The method of claim 1, wherein the second pretreatment composition comprises an impregnation accelerator,
wherein the second pretreatment composition comprises 0.01 wt % to 10 wt % of the impregnation accelerator, and
wherein the impregnation accelerator includes a nonionic surfactant, an ionic surfactant, or both thereof.

13. The method of claim 10, wherein the organic solvent includes alcohol having 1 to 20 carbon atoms, an aprotic solvent, or both thereof, and
wherein the second pretreatment composition has a mixing ratio (mass ratio) of one kind of alcohol to another kind of alcohol of 1:10 to 1:30 when applying two or more kinds of alcohols alcohol.

14. The method of claim 10, wherein the second pretreatment composition further comprises an aqueous solvent including alcohol, or a nonaqueous solvent including an aprotic solvent.

15. The method of claim 1, wherein the performing of the hot-pressing process comprises:
positioning the electrode layer such that the electrolyte layer comes into contact with each of the both surfaces of the porous support layer in a moisturized state or a semi-dried state; and
performing the hot-pressing process.

16. The method of claim 1, wherein the performing of the hot-pressing process comprises performing a roll lamination process at a temperature of 100° C. to 200° C., a pressure of 1 $kgf/cm^2$ to 100 $kgf/cm^2$ and a speed of 1 mm/sec to 100 mm/sec.

17. The method of claim 1, wherein the forming of the electrode layer comprises forming of the electrode catalyst layer, the forming of the functional layer and the forming of the electrolyte layer, which are performed by a continuous process.

18. The method of claim 1, wherein the porous support layer is dried by a vacuum drying method after dipping the porous support layer in the first pretreatment composition.

* * * * *